2,947,316
Patented Aug. 2, 1960

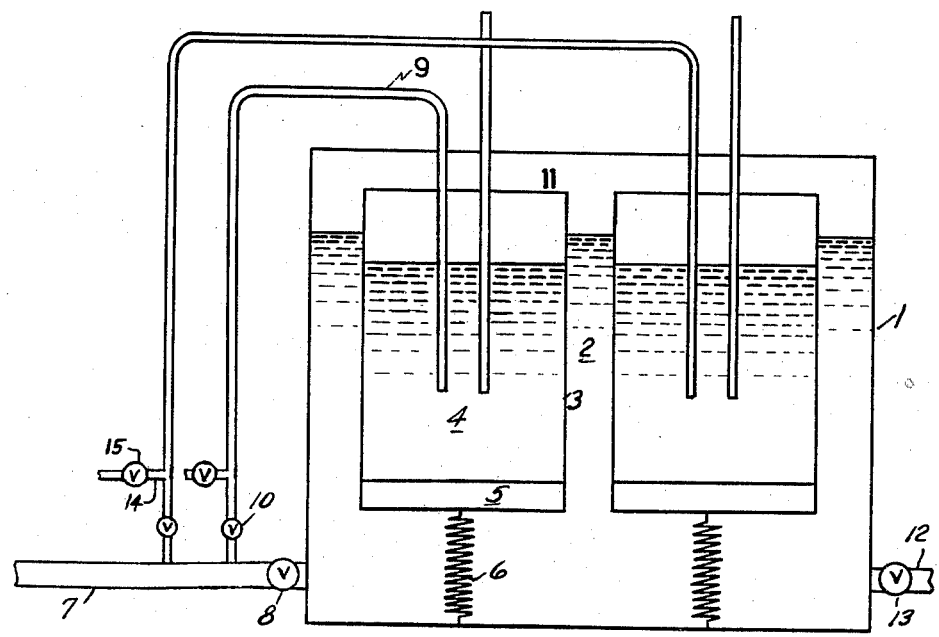

2,947,316

MEANS FOR THE CONTINUOUS PROPORTIONING OF TWO OR MORE LIQUIDS

William John Walker, 26 2nd Ave., Parktown N., Johannesburg, Union of South Africa Filed Dec. 23, 1957, Ser. No. 704,790

5 Claims. (Cl. 137—101.25)

This invention relates to the mixing of a liquid with another liquid or liquids, each in definite proportion, prior to their discharge for use.

It is usual for this purpose to provide complicated mechanical control apparatus, such as proportioning pumps, with or without variable stroke control, or control devices which are themselves meter-controlled. Due to the use of such apparatus, costs, including capital, installation, operating and maintenance costs, are relatively high. Also, difficulties arise when grit-contaminated, colloidal or relatively viscous liquids require to be handled by means of such apparatus.

It is one object of this invention to provide a relatively cheap and accurate continuous proportioning device for two or more liquids which is relatively inexpensive in first cost and easy to operate, maintain and control at low running and maintenance costs, even with liquids of relatively high viscosity, or contaminated by colloids, slimes or granular solids to an appreciable degree.

Another object is to provide means whereby this continuous and accurate proportioning is unaffected by any changes in the pressure, head or velocity of the primary liquid into which the other secondary liquid or liquids are to be proportioned. The same means ensures that this continuous and accurate proportioning is unaffected also by any concurrent changes in the pressure, head or velocity of the secondary liquid or liquids which are being proportioned into the primary liquid.

With the foregoing objects in view together with such objects and advantages as may subsequently appear, the invention resides generally in the provision of any number of, say, $n$ vessels, where $n$ is any integer equal to or greater than 2, each of the vessels containing one of the $n$ liquids to be proportioned continuously and accurately into the others. The apparatus is so arranged that $n-1$ of the vessels are floated in the liquid contained in the remaining vessel, the vertical flotation movements of each of these $n-1$ flotation vessels being spring-controlled by its own spring assembly, each of suitable characteristics for the flotation vessel concerned, whereby the proportion of each of the $n-1$ liquids discharged into the remaining or primary liquid stream is unaffected by any changes in the pressure, head or velocity, of the primary liquid or by any concurrent changes in the pressure, head or velocity of the remaining $n-1$ or secondary liquids.

The following is an explanation of the operation of the device. It has been found experimentally and also determined analytically that the use of flotation tanks as indicated, uncontrolled in their natural flotation movements by any spring assembly, does not provide absolute constancy of liquid proportioning, although they can be arranged to provide reasonable accuracy of liquid proportioning within given prescribed proportion limits which may be permissible in certain cases. The deviation from accurate proportionate control is the result of a change in the ratio of flows from the flotation tanks to that from the remaining vessel, due to a change in the ratio of the pressure plus hydrostatic heads in the flotation tanks to the pressure plus hydrostatic head in the remaining vessel. Further analysis and tests, however, have shown that all that is necessary in order to provide the required corrections to any departure from absolute constancy of liquid proportioning by the use of flotation tanks is to control the natural flotation movements of each of the respective $n-1$ flotation tanks by means of a suitably designed spring assembly in each case. The forces exerted by such spring assemblies are such as to alter the natural flotation movements of each of the $n-1$ flotation tanks in such a way as to ensure constancy of liquid proportioning of each of the $n-1$ liquids discharged into the primary stream. The use of the spring assemblies counteracts the inaccuracy of the use of free flotation tanks in the remaining vessel by exerting a greater downward force on the flotation tanks when the springs are in a strained position than is exerted when the springs take up a position conforming to a less strained condition. This results in the flotation tanks being held at a lower level than they would take up under free flotation conditions. Such spring control is designed therefore, to correct, automatically, any deviation from accurate proportionate control which results when the movements of the flotation tanks are uncontrolled. The mathematics expounding the principles involved in such spring design is fully set forth in a paper of mine published in the Transactions of the London Institution of Chemical Engineers, vol 37, No. 1, pages 9–13.

The invention further resides in the parts and in the combination, construction and arrangement of parts hereinafter described and claimed and illustrated in the accompanying drawing.

Fig. 1 shows diagrammatically the general arrangement of the apparatus pertaining to the invention, with parts in vertical section.

Referring to the figure specifically, 1 indicates the vessel containing the primary liquid 2, in which vessel 3, containing the secondary liquid 4, is floated. Vessel 3 may or may not be provided with a flotation volume space indicated by 5. Spring 6, of suitable characteristics, is provided to control the extent of the vertical movements of vessel 3. The air or other gas contained in the spaces over the liquids 2 and 4, in vessels 1 and 3, respectively, is the same gas in each of these spaces, the spaces being in open communication with each other by way of suitable and adequate openings at the top of vessel 3. The air or gas pressure in these two spaces is, therefore, the same and may have any value consistent with the strength of vessels 1 and 3 and the associated piping. The primary liquid 2 is discharged from vessel 1 by way of the discharge pipe 7, the rate of discharge of liquid 2 from vessel 1 being controlled by the setting of the valve 8. The secondary liquid 4 is discharged from vessel 3 into pipe 7, by way of the siphon pipe 9, the rate of this discharge being controlled by the setting of valve 10.

In the arrangement shown, in the figure, the open communication required between the gas spaces over liquids 2 and 4, is provided by ensuring, as shown, sufficient clearance between the siphon pipe 9 and the top cover, if any, of vessel 3.

If it is desired to mix, say, $n$ liquids, then there will be $n-1$ flotation vessels floated in the flotation liquid 2; and items 3, 4, 5, 6, 9 and 10, will be repeated under designations, such as for example 3a, 4a, 5a, 6a, 9a and 10a for the second flotation vessel, 3b, 4b, 5b, 6b, 9b and 10b for the third flotation vessel and so on, it being understood that the numerals correspond to similar items in each case. This arrangement is shown for three liquids in Fig. 3, page 11 of my paper published in the Transactions of the Institution of Chemical Engineers, London, vol. 37, No. 1, 1959.

There is further provided the inlet pipe 12 with inlet valve 13 to control any inlet flow of the primary fluid from some external source, into vessel 1.

Prior to setting the invention into operation the syphon pipe 9, must be filled in order to ensure initiation of flow therein when the invention is set into operation. This is best achieved by the provision of a suction nozzle 14 and valve 15. Valve 15 is normally closed during operation of the invention. Prior to starting operation of the invention, however, valve 15 is opened and suction pressure applied thereto in order to fill the syphon pipe 9 up to valve 10. The invention is then ready for operation after closing valve 15.

Four different methods of using this apparatus for the continuous and accurate proportioning of two liquids will now be described.

The first method is here called the "atmospheric static method." In this case, the liquids 2 and 4 in vessels 1 and 3 are under atmospheric pressure and valve 13 is permanently closed so that there is no flow of the primary liquid 2 into vessel 1. In such a case, pipe 12 and valve 13 may be dispensed with.

The second method is here called the "atmospheric flow method." In this case, vessels 1 and 3 are under atmospheric pressure but valve 13 is open so that, during discharge through pipe 7 and control valve 8, the vessel 1 is being continuously replenished with its liquid 2, as discharge is taking place.

The third method is called the "closed static method." In this case vessel 1 is closed so that any gas pressure, consistent with the strength of vessels 1 and 3 and the associated piping, may be maintained over the surfaces of liquids 2 and 4. Also, valve 13 is permanently closed, so that it and the inlet pipe 12 may be dispensed with. Should the gas contained in the spaces over the surfaces of the liquids 2 and 4 tend to become absorbed in either or both these liquids, the gas pressure may, by means of any of the well known methods, be maintained within workable limits, by delivery of gas to these spaces as required.

The fourth method is here called the "closed flow method." In this case, vessel 1 is closed so that, with valve 13 open and inlet flow of liquid 2 to vessel 1 taking place through pipe 12, the gas contained above liquids 2 and 4 will be compressed to a degree depending upon the pressure of supply of liquid 2 from its external source and on the velocity of flow of liquid 2 through the apparatus. Here, also, as in the third or "closed static method," the gas pressure over liquids 2 and 4 may be maintained, if required, as indicated for that method.

The foregoing description of these four methods of operation of the invention in the case of the mixing of two liquids in constant and accurate proportion, may obviously be extended for any number of liquids by the provision of the required number of flotation vessels and their accessories in any given case.

It should be noted that the design of the springs used to maintain accurate proportionate control is in no way affected by the difference between the pressure head over the liquids and the pressure head at their mixing point, since this difference factor cancels out in the analysis. This is clearly shown in the aforementioned paper. This being the case, the spring design is in no way affected whether valve 13 is closed, as in the first and third methods, or open, as in the second and fourth methods.

In all cases, should it be necessary, or desirable, to do so, replenishment of any of the vessels, each with its own respective liquid, may be maintained by any of the well known means available for such a purpose.

The arrangement of the apparatus thus far described is such that by providing each of the flotation vessels, incorporated in the apparatus, with a control spring as indicated, it is possible, by relating the spring characteristics to the flotation characteristics of the flotation vessel concerned, to ensure that the ratio of the velocity of discharge of, for example, the secondary fluid 2 through its control valve 10, to that of the primary fluid 1 through its control valve 8, will in all cases remain constant under any variations in pressure, head or velocity of either or both the primary and secondary fluids concerned. So long, therefore, as the settings of the discharge valves 8 and 10 remain unaltered, the ratio of the corresponding rates of discharge of liquid 2 through its control valve 10 to that of liquid 1 through its control valve 8 will also remain constant under such variations.

While I have shown and described the general method, and variations thereof, whereby my invention may be put into operation, I do not limit myself to the exact details of the arrangements shown and described, but may employ such changes and modifications as clearly come within the meaning and scope of the appended claims.

I claim:

1. Liquid proportioning apparatus for the mixing of liquids continuously and in accurate proportions, comprising a main vessel having a discharge pipe, containing one of the liquids, and flotation vessels floating in the liquid contained in the main vessel, each flotation vessel containing one of the other liquids to be mixed with the liquid from the main vessel, and each said flotation vessel being provided with a discharge pipe, all vessels being subjected to the same air or gas pressure above the surface of their respective liquids, provision being made therefor by the provision of suitable openings, as required, in the covers of the main and flotation vessels, the vertical movements of each of the flotation vessels being controlled by the spring action of a separate spring assembly in each case, incorporated between the main and the corresponding flotation vessel, the strength of each spring being correlated with the ratio of the head in its associated flotation vessel and the head in the main vessel, so that on deviation of such ratio for any flotation vessel the spring of the associated vessel will be stressed in a direction tending to vary the flow from each flotation vessel in a manner to restore its ratio, the separate discharge of each of the liquids being arranged to pass through their respective discharge pipes which are arranged to meet at a common junction or junctions where mixing takes place.

2. Liquid proportioning apparatus according to claim 1, wherein the discharge pipes from the flotation vessels are syphon pipes.

3. Liquid proportioning apparatus according to claim 1, wherein the discharge pipes for each of the liquids are provided with control valves for the purpose of controlling the exact proportion of any one liquid to the others as desired, the respective proportions being fixed for all conditions of flow, once all the control valves have been set.

4. Liquid proportioning apparatus according to claim 1, wherein the main vessel is provided with an inlet pipe and inlet control valve whereby the liquid in the main tank may be continuously replenished as discharge therefrom takes place.

5. Liquid proportioning apparatus according to claim 1, wherein the common gas or air pressure above each of the liquids may have any values consistent with the strength of all the vessels and their associated piping.

References Cited in the file of this patent

UNITED STATES PATENTS

| 831,059 | Grath | Sept. 18, 1906 |
| 1,623,132 | Pennet et al. | Apr. 5, 1927 |
| 1,966,658 | Wade | July 17, 1934 |

FOREIGN PATENTS

| 715,886 | Great Britain | Sept. 22, 1954 |